(12) United States Patent  
Cedergren et al.

(10) Patent No.: US 9,094,250 B2  
(45) Date of Patent: Jul. 28, 2015

(54) METHOD OF CHANNEL CANCELLATION, RADIO RECEIVER, CELLULAR COMMUNICATION DEVICE AND COMPUTER PROGRAM

(75) Inventors: Andreas Cedergren, Bjärred (SE); Lennart Morén, Båstad (SE); Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/129,151

(22) PCT Filed: Jun. 21, 2012

(86) PCT No.: PCT/EP2012/061995
§ 371 (c)(1),
(2), (4) Date: Apr. 11, 2014

(87) PCT Pub. No.: WO2013/000820
PCT Pub. Date: Jan. 3, 2013

(65) Prior Publication Data
US 2014/0301510 A1    Oct. 9, 2014

Related U.S. Application Data

(60) Provisional application No. 61/504,416, filed on Jul. 5, 2011.

(30) Foreign Application Priority Data

Jun. 29, 2011    (EP) .................................... 11171972

(51) Int. Cl.
*H03D 1/06*    (2006.01)
*H04L 25/03*    (2006.01)
*H04B 1/7107*    (2011.01)
*H04L 25/08*    (2006.01)
*H04J 11/00*    (2006.01)

(52) U.S. Cl.
CPC ...... *H04L 25/03305* (2013.01); *H04B 1/71072* (2013.01); *H04L 25/08* (2013.01); *H04J 11/004* (2013.01)

(58) Field of Classification Search
None
See application file for complete search history.

(56) References Cited

U.S. PATENT DOCUMENTS 6,067,292 A    5/2000    Huang et al.
6,404,760 B1    6/2002    Holtzman et al.
(Continued)

FOREIGN PATENT DOCUMENTS

WO    0106664 A2    1/2001
WO    2006094141 A2    9/2006

*Primary Examiner* — Adolf Dsouza
(74) *Attorney, Agent, or Firm* — Murphy, Bilak & Homiller, PLLC (57) ABSTRACT

A method of channel cancellation for a cellular communication device comprises receiving a signal comprising desired symbols and interfering symbols; regenerating a symbol sequence of interfering symbols expected to be received; determining, prior to any complete decoding of the interfering symbols by the cellular communication device, whether received interfering symbols agree with the regenerated interfering symbols, and then if the received interfering symbols are determined to agree with regenerated interfering symbols, subtracting the regenerated symbol sequence from the received signal to form an adapted signal, or if the received interfering symbols are determined not to agree with regenerated interfering symbols, omitting at least the regenerated interfering symbols not agreeing with the received interfering symbols from the subtracting of the regenerated symbol sequence from the received signal when forming the adapted signal; and then decoding the desired symbols from the adapted signal.

18 Claims, 4 Drawing Sheets

(56) References Cited

U.S. PATENT DOCUMENTS

| | | |
|---|---|---|
| 6,553,058 B1 | 4/2003 | Naito |
| 6,967,991 B1 | 11/2005 | Haga et al. |
| 7,725,079 B2 | 5/2010 | Kim et al. |
| 2006/0227908 A1* | 10/2006 | Scharf et al. .................. 375/346 |
| 2010/0091822 A1 | 4/2010 | Cookman et al. |

* cited by examiner

METHOD OF CHANNEL CANCELLATION, RADIO RECEIVER, CELLULAR COMMUNICATION DEVICE AND COMPUTER PROGRAM

TECHNICAL FIELD

The present invention generally relates to a method of channel cancellation, and a radio receiver, a cellular communication device and a computer program for employing channel cancellation.

BACKGROUND

Interference limits the throughput in cellular communication systems. At receiving end, receivers try to reduce the impact of the interference. One approach used to reduce the impact of interference is channel cancellation in which channels with known interfering symbols are removed from the received signal prior to processing the unknown channels. Here, symbols on other channels may carry important information to the UE, but for other parts or purposes, and it is therefore desirable to remove them from the signal during reception to improve reception performance. The cancellation may for example reduce inter symbol interference. These unknown channels can consist of both control channels and data channels, where typically the latter will benefit the most from interference cancellation due to their typically higher Signal-to-Interference-and-Noise-Ratio (SINR) requirements.

The channels with known symbols are typically channels that repeatedly transmit the same symbols. The sequence of known symbols may be known a priori, e.g. from system information or specifications and for example some synchronisation channels, or be determined by demodulating and decoding the symbols. The latter case is often referred to as successive interference cancellation (SIC). For the case that the symbols are always known a priori, performing interference channel cancellation is a straightforward task and traditionally used in the field of technology. However, if this is not always the case, improper cancelling, i.e. cancelling wrong symbols, may decrease performance.

SUMMARY

An object of the invention is to at least alleviate the above stated problem. The present invention is based on the understanding that some interfering channels may also be semi-static so that the symbol sequence, even though it may change, does not change during long periods of time. Channel cancellation according to the suggested solutions enables improvement of reception of desired channels.

According to a first aspect, there is provided a method of channel cancellation for a cellular communication device. The method comprises receiving a signal comprising desired symbols and interfering symbols; regenerating a symbol sequence of interfering symbols expected to be received; determining, prior to any complete decoding of the interfering symbols by the cellular communication device, whether one or more received interfering symbols agree with the regenerated interfering symbols, and then, if the one or more received interfering symbols are determined to agree with regenerated interfering symbols, subtracting the regenerated symbol sequence from the received signal to form an adapted signal, or if the one or more received interfering symbols are determined not to agree with regenerated interfering symbols, omitting at least the regenerated interfering symbols not agreeing with the received interfering symbols from the subtracting of the regenerated symbol sequence from the received signal when forming the adapted signal; and then decoding the desired symbols from the adapted signal.

The determining whether one or more received interfering symbols agree with the regenerated interfering symbols may comprise comparing a signal corresponding to the one or more received interfering symbols with a signal corresponding to one or more of the regenerated interfering symbols. The determining whether one or more received interfering symbols agree with the regenerated interfering symbols may additionally or alternatively comprise detecting an update tag of the interfering symbols, wherein the one or more received interfering symbols are considered not to agree with the regenerated interfering symbols upon indication of an update by the update tag.

The determining whether one or more received interfering symbols agree with the regenerated interfering symbols may include determination for each transport block of interfering symbols of the received signal. The omitting of at least the regenerated interfering symbols not agreeing with received interfering symbols from subtraction may comprise omitting the regenerated interfering symbols for those transport blocks of the interfering symbols where the regenerated interfering symbols are determined to not agree with received interfering symbols.

The method may further comprise updating the symbol sequence of interfering symbols expected to be received if one or more received interfering symbols are determined not to agree with regenerated interfering symbols. The updating may comprise decoding the received interfering symbols; and storing one or more representations of the decoded interfering symbols as the sequence of interfering symbols expected to be received. The updating may, of the symbol sequence, only include parts of the symbol sequence corresponding to transport block of interfering symbols where the regenerated interfering symbols are not agreeing with received interfering symbols. A stored representation of the interfering symbols may comprise the decoded information bits of the interfering signal, from which the corresponding interfering symbols can be regenerated as needed, the regenerated sequence of interfering symbols, or a chip sample sequence corresponding to the interfering symbols.

The determining if one or more received interfering symbols agree with regenerated interfering symbols may comprise comparing the detected interfering symbols with corresponding regenerated interfering symbols. The comparing of the decoded interfering symbols with corresponding regenerated interfering symbols may comprise determining a difference between the decoded interfering symbols with corresponding regenerated interfering symbols. The determining if one or more received interfering symbols agree with regenerated interfering symbols may comprise comparing the difference with a threshold. Agreement may be established if the difference is lower than the threshold.

According to a second aspect, there is provided a radio receiver for a cellular communication device. The radio receiver comprises radio receiver circuitry arranged to receive a radio signal and provide a baseband signal comprising desired symbols and interfering symbols; a channel cancellation mechanism arranged to receive the baseband signal from the radio receiver circuitry, and further arranged to output an adapted baseband signal; and a decoder arranged to decode desired symbols from the adapted baseband signal. The channel cancellation mechanism comprises a symbol sequence regenerator arranged to regenerate interfering symbols expected to be received; a channel cancellation controller arranged to determine whether the one or more received interfering symbols agree with regenerated interfering symbols; and a signal subtraction circuitry arranged to, if the one or more received interfering symbols are determined to agree with regenerated interfering symbols, subtract a signal corresponding to the regenerated interfering symbols from the baseband signal to form the adapted baseband signal, or, if the one or more received interfering symbols are determined not to agree with regenerated interfering symbols, omit the subtraction of at least the regenerated interfering symbols not agreeing with the received interfering symbols from the baseband signal when forming the adapted baseband signal. The channel cancellation controller is arranged to perform the determination before any complete decoding of interfering symbols simultaneous with the desired symbols of the received signal is performed by the radio receiver.

The channel cancellation controller may comprise an agreement determinator arranged to determine if one or more received interfering symbols agree with regenerated interfering symbols. The agreement determinator may comprise a comparator arranged to compare the signal of interfering symbols with corresponding signal of regenerated interfering symbols. The comparator may be arranged to determine a difference between extracted interfering symbols with corresponding regenerated interfering symbols. The determination if one or more received interfering symbols agree with regenerated interfering signals may comprise a comparison of the difference with a threshold. Agreement may be established if the difference is lower than the threshold.

The channel cancellation controller may further be arranged to detect an update tag of the interfering symbols, wherein the one or more received interfering symbols are considered not to agree with the regenerated interfering symbols upon indication of an update by the update tag.

For the one or more received interfering symbols to be determined whether to agree with the corresponding regenerated interfering symbols, determination may be for each transport block of the interfering symbols of the received signal. The omission of subtraction of at least the regenerated interfering symbols not agreeing with received interfering symbols may comprise omission of subtraction of the regenerated interfering symbols for those transport blocks of the interfering symbols where the regenerated interfering symbols are not agreeing with decoded interfering symbols.

The symbol sequence regenerator may be arranged to update the symbol sequence of interfering symbols expected to be received if one or more detected interfering symbols are determined not to agree with regenerated interfering symbols by decoding the received interfering symbols and store one or more representations of the decoded interfering symbols as the sequence of interfering symbols expected to be received. The symbol sequence regenerator may be arranged to update the symbol sequence only for parts of the symbol sequence corresponding to transport blocks of the interfering symbols where the regenerated interfering symbols are not agreeing with received interfering symbols. In some embodiments, one stored representation of the interfering symbols comprises the decoded information bits of the interfering signal, from which the corresponding interfering symbols can be regenerated as needed. In some embodiments, one stored representation of the interfering symbols comprises the regenerated sequence of interfering symbols. In some embodiments, one stored representation of the interfering symbols comprises a chip sample sequence corresponding to the interfering symbols.

According to a third aspect, there is provided a cellular communication apparatus comprising a radio receiver according to the second aspect, and/or arranged to perform the method according to the first aspect.

Similarly, the radio receiver may be arranged to perform the method according to the first aspect.

According to a fourth aspect, there is provided a computer program comprising computer executable instructions which when executed on a processor of a radio receiver is arranged to perform the method according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

By identifying whether a semi-static received interfering symbol sequence has changed, use of wrong symbols in the channel cancellation is avoided, and improvement in reception is thereby achieved.

The basic idea is to detect whether the received interfering symbol sequence differs from a previous sequence which has been considered as temporarily static, i.e. a semi-static channel. This detection is preferably made before the whole sequence has been demodulated and decoded such that the drawbacks can be avoided in time. If there is a difference detected, i.e. the sequence or parts of the sequence has changed, channel cancellation is aborted for a while and an updated sequence, which may be temporarily static, is established. The detection of change is preferably made on the baseband signal directly, e.g. on symbol level directly after despreading, since decoding is then not necessary for the detection, but may be performed on bit level too, i.e. on a decoded or partly decoded signal.

The invention will here be described in detail. We exemplify the invention for describing some of the inventive actions and structures by considering the P-CCPCH (Primary common control physical channel) in WCDMA but the invention is neither limited to P-CCPCH, nor to WCDMA. Another example of a WCDMA channel is part 1 of the HS-SCCH (High Speed Shared Control Channel) which frequently can be seen as semi-static. The LTE broadcast channel is another one for this kind of interference cancellation of semi-static channels.

The P-CCPCH carries the BCH (Broadcast channel) that is used to broadcast system and cell-specific information. This information is typically unchanged for long periods of time making the P-CCPCH a semi-static channel. The P-CCPCH uses spreading factor 256 corresponding to 10 symbols per slot. Nothing is transmitted on the P-CCPCH during the first symbol as this symbol is occupied by the Synchronization channel (SCH). The BCH uses a single transport block with 246 information bits in each transmission time interval (TTI) of length 20 ms (30 slots). The broadcast information is transmitted repeatedly with different intervals depending on the importance of the information. The Master Information Bock (MIB) is transmitted every 80 ms and contains information about the location and frequency of System Information Blocks (SIBs) and System Blocks (SBs). Blocks may be updated. Some blocks are updated relatively frequently and the UE is therefore required to receive and update the contents of these blocks with a certain time interval. Some blocks are updated less frequently and such updates are indicated by a tag in the MIB as well as on the paging channel. Some time critical updates are announced on the paging channel prior to the change together with the time at which the block will be updated.

An approach for P-CCPCH cancellation is to receive the broadcast information and assume or expect that the corresponding symbol sequence is transmitted repeatedly. The P-CCPCH can then be cancelled from the received signal prior to demodulating other physical channels, using a suitable cancelling method. For example, a straightforward way can be to estimate the gain of the P-CCPCH channel as well as the propagation channel, re-encode the transmitted P-CCPCH sequence, convolve with the propagation channel and subtract from the received signal. The subtraction would typically occur at chip level, but may also be done at symbol level. This will reduce the interference and thus improve the reception performance for other physical channels.

If a P-CCPCH block changes then the transmitted symbols corresponding to this block differs from the assumed or expected symbols. If the information on the P-CCPCH changes in a second TTI, then the symbols transmitted in the second TTI differs from the symbols received in a first TTI. The cancellation, based on the assumed symbols in a first TTI, will then be incorrect for such symbols. This introduces additional interference until the assumed symbols have been updated and thus reduces demodulation performance for other physical channels. Since the P-CCPCH TTI carrying such a block is 10 times longer than the HS-PDSCH TTI, this may have a considerable impact on the data throughput, possibly causing also higher layer retransmissions. Note that buffering of the whole TTI prior to demodulation/decoding of the unknown channels is unfeasible due to time constraints on response times. The very large buffer required would also be costly.

The trick is to detect whether the assumed symbol sequence has changed, which in this example corresponds to detecting whether a P-CCPCH block has changed before the end of the current TTI, and when a change is detected, to abort cancellation of the P-CCPCH and omit cancellation during the time that this block is transmitted. The cancellation of the symbols corresponding to this block can be restarted when the block has been successfully decoded, and stored, so that the expected interfering symbols can be properly regenerated.

Figure 1:
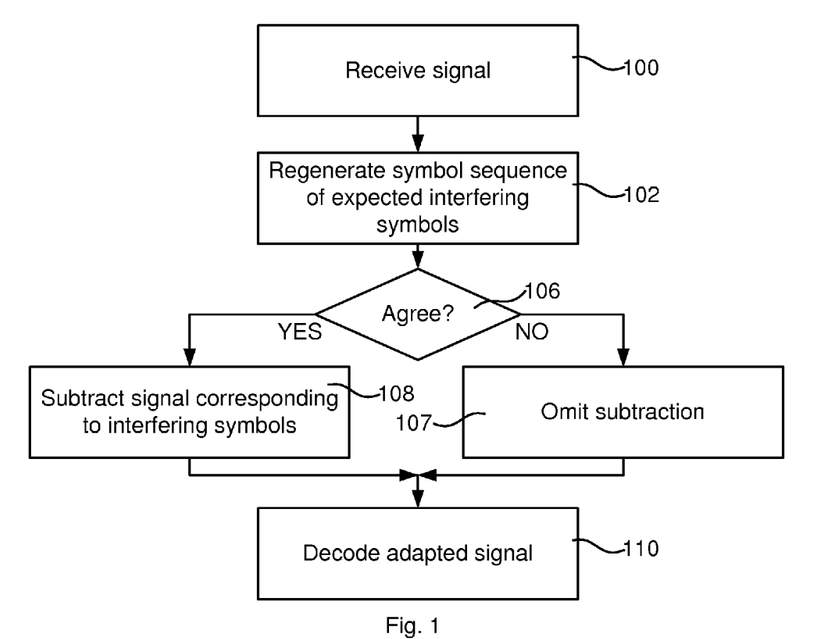
FIG. 1 is a flow chart illustrating a method of channel cancellation according to an embodiment.

FIG. 1 is a flow chart illustrating a method of channel cancellation according to an embodiment. Upon receiving 100 a signal comprising both desired symbols and interfering symbols, e.g. another channel that may not be the one that is of interest at the moment or be intended for another user, the interfering signals can be expected or assumed based on knowledge in the system. For example, this can comprise knowledge that the currently transmitted interfering signal comprises or can be derived from the same information that was transmitted and correctly received at some earlier time instant. Therefore, a symbol sequence of interfering symbols expected to be received is regenerated 102. Due to the semi-static properties of the symbol sequence of interfering symbols expected to be received, i.e. the symbol sequence of interfering symbols is not entirely static, the correctness of the sequence is determined 106, i.e. whether one or more received interfering symbols agree with the regenerated interfering symbols, which is made prior to any complete decoding of the interfering symbols by the cellular communication device. This provides a great advantage since cancellation can be aborted when the received interfering symbols does not agree with the regenerated interfering symbols. The advantage, compared to just assuming that the interfering symbols are known, includes being much more sure that the assumption is right, and compared to completely determining the interfering symbols, includes being a lot more faster, which implies that buffering and latency issues are minimised. The interference cancelling approach is then based on this determination 106, which can be based on a comparison of signal pattern, e.g. on bit basis or symbol basis, of a portion of the received signal with a corresponding portion of the assumed interfering signal, and/or be based on system information that is detected, i.e. detecting some update tag provided in the signal, such as in the MIB as demonstrated above. Thus, if the one or more received interfering symbols are determined to agree with regenerated interfering symbols, it is clear that interference cancelling implies an improvement, and the regenerated symbol sequence is subtracted from the received signal to form an adapted signal. Here, "the regenerated symbol sequence" and "the received signal" should of course be represented in the same way such that the subtraction provides interference cancelling. Thus, signal representation at subtraction should be aligned. On the other hand, if the one or more received interfering symbols are determined not to agree with regenerated interfering symbols, such subtraction would not imply any improvement, rather the opposite. Therefore, if there is no agreement determined, at least the regenerated interfering symbols not agreeing with the received interfering symbols are omitted 107 from the subtraction 108 of the regenerated symbol sequence from the received signal when forming the adapted signal. This can mean that for some time, when the interfering symbols come unexpected, the "adapted" signal can be identical to the original signal, but this is a temporary phenomenon caused by the omission of channel cancellation when forming the adapted signal. When the adapted signal is formed (or actively maintained in original shape), the desired symbols are decoded 110 from the adapted signal.

Figure 2:
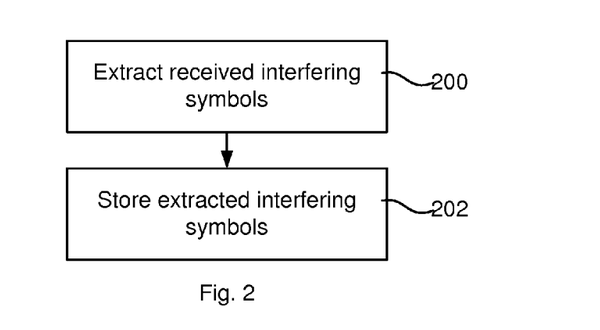
FIG. 2 is a flow chart illustrating update of interference symbol sequence to be regenerated according to an embodiment.

FIG. 2 is a flow chart illustrating update of interference symbol sequence to be regenerated according to an embodiment. The method can be made self-learning by updating what interfering symbols to expect at any given moment. This can be made upon determination that a change has occurred, i.e. there is no longer any agreement between the assumed interfering signal and the regenerated one, determined according to what has been demonstrated above. This can trigger an update where the new interfering symbols are extracted 200, in a format according to the demonstrated alternatives above, and then one or more representations of the interfering symbols are stored 202 for use in interference cancelling later on when those interfering symbols can be expected to be received again. In some embodiments, one stored representation of the interfering symbols comprises the decoded information bits of the interfering signal, from which the corresponding interfering symbols can be regenerated as needed. In some embodiments, one stored representation of the interfering symbols comprises the regenerated sequence of interfering symbols. In some embodiments, one stored representation of the interfering symbols comprises a chip sample sequence corresponding to the interfering symbols. At the subtraction 108, the received signal from which the interfering symbols should be subtracted, and the interfering symbols of course need to be in the same format. Depending on the stored representation, this can either be used directly for the subtraction operation, or be adapted to proper format at the regeneration 102. Thus, the chosen representation and the implementation of the regeneration are matched.

Figure 3:
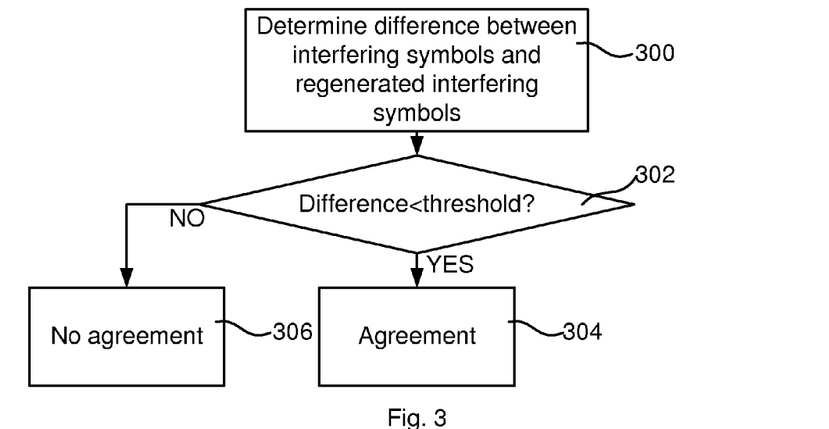
FIG. 3 is a flow chart illustrating determination of agreement between regenerated interference symbol sequence and extracted interfering symbols according to an embodiment.

FIG. 3 is a flow chart illustrating determination of agreement between the regenerated interference symbol sequence and extracted interfering symbols according to an embodiment. Here, the determination of agreement is based on comparison of the assumed or expected interfering symbols or their corresponding signal, and the received interfering symbols or signal. Parts of a first sequence of the interfering channel is detected and possibly decoded. Symbols s of the same part in the new sequence of the interfering channel is received, and compared with the expected symbols $s_0$. Thus, a difference $d_s=|s-s_0|$ is determined 300. If the expected and newly received symbols $s_0$, s are close enough in some metric, it is assumed that the interfering channel for this part of the sequence is the same as for the corresponding part of the previous sequence, and the interfering signal can be cancelled from the received signal. Thus, the difference $d_s$ is compared with a threshold $d_t$, and if the difference is small enough, i.e. $d_s<d_t$, the assumed symbols $s_0$, i.e. the regenerated sequence, is considered to agree 304 with the received interfering symbols s, and cancelling is enabled, while the opposite, i.e. there is no agreement 306, implies omitting those expected symbols $s_0$ from subtraction. After the current part of the sequence has been processed, the procedure is restarted for yet another part, and the adaptation process proceeds. For example, the part of the interfering signal being decided to be cancelled or not can be based on whole TTIs of the interfering signals, or for a transmission block. The decision is preferably made on a smaller signal portion and can operate per one or a few received symbol of the interfering signal.

The decision whether to disable the channel cancellation can be based on a comparison of the received coded symbols with the expected coded symbols. The cancellation may for example be aborted when the difference is larger than a threshold. The difference can be measured in many different ways. We may consider the absolute error or the error power. We may consider the relative error. The error may be measured based on one or more symbols. We may for example consider the running average of the symbols received so far.

The threshold $d_t$ may be fixed or dependent on the number of considered received symbols, the signal to interference and noise ratio SINR of the received symbols and/or the likelihood that the symbols have been updated.

One example detection criteria may be $$\frac{1}{N}\sum_{k=1}^{N}\frac{|s-s_0|^2}{|s|^2} \geq \alpha_0 + \left(\alpha_1 + \frac{\alpha_2}{N}\right)\cdot\frac{1}{SINR}$$

where s and $s_0$ denote the received and expected (regenerated) P-CCPCH symbols, respectively, N denotes the number of received P-CCPCH symbols when evaluating the criterion, and $\alpha_0$, $\alpha_1$ and $\alpha_2$ are design parameters. This means that we estimate the relative power of the symbol error and compare it with the relative noise level. The reliability of the estimate increases with the number of symbols which is reflected by reducing the threshold as N increases. The parameters may be selected based on the likelihood that the symbols have been updated. Symbols corresponding to System Information Blocks (SIBs) with associated timers may use a lower threshold as they are more likely to be updated.

It is desired that the subtraction of faulty symbols is aborted as early as possible, in order to minimize the negative impact on the other physical channels. On the other hand, the confidence of whether e.g. the P-CCPCH has changed or not may be very small initially, and increase over time. In some embodiments of the invention, the demodulation of other channels is therefore delayed in order to await a more reliable decision on whether to apply cancellation or not for this P-CCPCH TTI.

The SINR that the data channels experience will be different for the cases where 1) the correct P-CCPCH symbols are cancelled, 2) no cancellation takes place and 3) the wrong P-CCPCH symbols are subtracted, where the first case yields the highest SNR and the last case the lowest. In some embodiments of the invention, the information on which of the cases currently applies is used to adjust the CQI, which is the measured downlink channel quality and is reported by the UE to the network.

Figure 4:
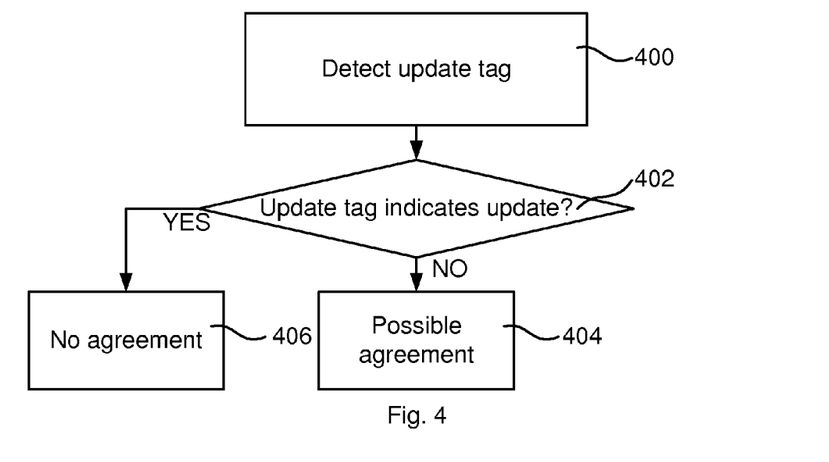
FIG. 4 is a flow chart illustrating determination of agreement based on provided system information according to an embodiment.

FIG. 4 is a flow chart illustrating determination of agreement based on provided system information according to an embodiment. The decision to abort cancellation may also be based on indications from the network. The network may, for example, indicate that a System Information Block (SIB) will be updated at a given time. It is then possible to abort cancellation of the corresponding symbols without any comparison. The Master Information Bock (MIB) is transmitted every 80 ms and contains information about the location and frequency of SIBs and System Blocks (SBs). Thus, detection 400 of any update tag is made, e.g. in a MIB, and it is checked 402 whether the update tag indicates an update. If the update tag indicates an update, then it is a priori known that there is no agreement 406, while if no such indication is present, this gives the information that there is a possible agreement 404.

The fact that update tags are not present for all types of interferers, and even if they are, detection may be cumbersome. Therefore, it is an advantage to use the approaches presented in FIGS. 3 and 4 in combination, where the a priori knowledge provided by an update tag has its advantage in that it normally provides its information rather early compared to a comparison which is done as the interfering symbols already are incoming, while the comparison works at all times such that when the update tag information is scarce or nothing, the comparison can still be applied.

Figure 5:
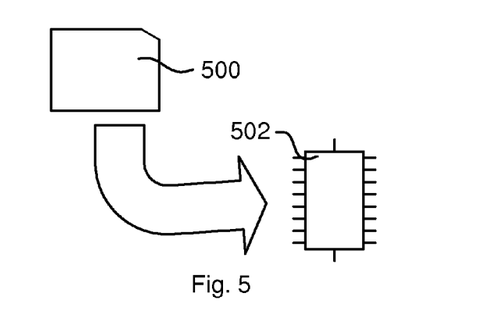
FIG. 5 illustrates a computer-readable medium for storing a computer program comprising computer executable instructions which when downloaded to and executed on a processor of a radio receiver is arranged to perform the method according to embodiments.

FIG. 5 illustrates a computer-readable medium for storing a computer program comprising computer executable instructions which when downloaded to and executed on a processor of a radio receiver is arranged to perform the method according to embodiments.

Figure 6:
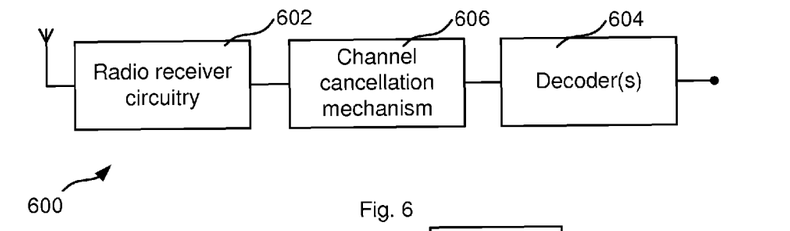
FIG. 6 is a block diagram schematically illustrating a radio receiver according to an embodiment.

The methods according to the present invention are suitable for implementation with aid of processing means, such as computers and/or processors, especially for the case where the radio receiver is computer controlled. Therefore, there is provided computer programs, comprising instructions arranged to cause the processing means, processor, or computer to perform the steps of any of the methods according to any of the embodiments described with reference to FIGS. 1 to 4. The computer programs preferably comprises program code which is stored on a computer readable medium 500, as illustrated in FIG. 5, which can be loaded and executed by a processing means, processor, or computer 502 of a radio receiver 600 as illustrated in FIG. 6 to cause it to perform the methods, respectively, according to embodiments of the present invention, preferably as any of the embodiments described with reference to FIGS. 1 to 4. The computer 502 and computer program product 500 can be arranged to execute the program code sequentially where actions of the any of the methods are performed stepwise, but can as well be performed according to a real-time schedule. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

FIG. 6 is a block diagram schematically illustrating a radio receiver 600 according to an embodiment. A radio receiver circuitry 602 is arranged to receive a radio signal by one or several antennas, amplify the antenna signal, down-convert the signal, and possibly convert the signal into a digital representation, and/or perform analog filtering and detection. The approach is very much depending on the system in which the radio receiver is arranged to work. The use in a cellular communication system, e.g. any of the above mentioned WCDMA or LTE, raises different demands and the art provides different means therefore. However, this is not a part of the inventive contributions of this disclosure, but it is worth mentioning that in this disclosure, the output of the radio receiver circuitry is called "baseband signal", which may divert from its use from a radio circuit designer point of view. In this disclosure, the term "baseband signal" means the processed output from a radio receiver suitable for the communication system in which it is intended to work, and from which information represented by the signal is retrievable by analog and/or digital circuitry for decoding the information. This "baseband signal" is provided to a channel cancellation mechanism 606, which is arranged to work according to the principles and functions demonstrated above, and can be arranged according to the structures further demonstrated below with reference to FIGS. 7 and 8. The channel cancellation mechanism 606 is arranged to provide an adapted "baseband signal" to a decoder 604, which thereby is given the facilitated task of decoding desired symbols from the adapted baseband signal since any interfering symbols have been cancelled at least to some degree by the channel cancellation mechanism 606. The decoder 604 is, as the radio receiver circuitry 602, preferably adapted to the system in which the radio receiver 600 is arranged to work, but since neither the decoder 604, nor the radio receiver circuitry 602 is the main inventive contribution of this disclosure, their structures will not be further elucidated here.

A brief example of a particular function involving the decoder will however be given. E.g. interfering P-CCPCH is demodulated by the radio receiver circuitry 602 to generate coded symbols s. These symbols s are decoded by the decoder 604. The information bits will then be available, provided that the decoding was successful. The corresponding information bits may then be re-encoded and mapped to symbols, $s_0$, thus providing an update of the known symbol sequence. Note that the updated information bits may be used to update several parts of the known symbol sequence as part of the information may be repeated more than once in the sequence.

The known symbols may be compared with received symbols to determine if the received symbols are similar to the known symbols. It may, alternatively, be indicated by the network that the symbols have been updated. The channel cancellation is enabled as long as the received symbols are similar to the known symbols. The channel cancellation can cancel the symbols by regenerating the corresponding signal at the chip level. The received signal after P-CCPCH cancellation is used to demodulate and decode, respectively, other physical channels.

Figure 7:
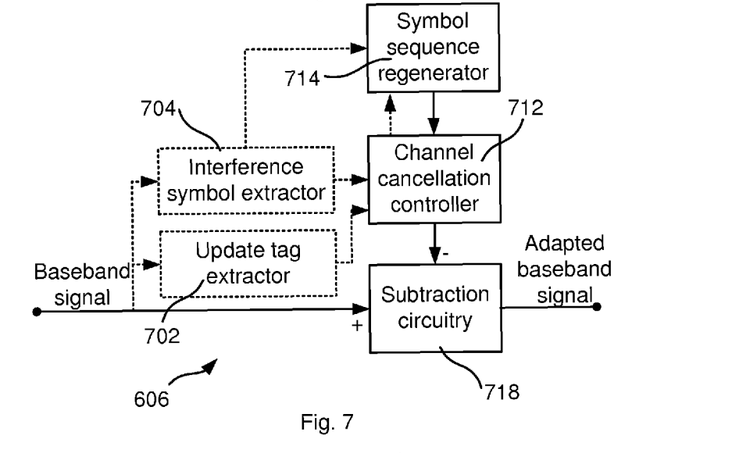
FIG. 7 is a block diagram schematically illustrating a channel cancellation mechanism according to an embodiment.

FIG. 7 is a block diagram schematically illustrating a channel cancellation mechanism 606 according to an embodiment. The channel cancellation mechanism 606 comprises a channel cancellation controller 712 arranged to provide the adaptation features demonstrated above, i.e. to control whether and on which parts of the signal channel cancellation is to be made. A symbol sequence regenerator 714 provides a sequence or signal corresponding thereto of symbols assumed to be interfering symbols in a received signal from radio receiver circuitry. The channel cancellation controller 712 decides whether a subtraction circuitry 718 should subtract the assumed interfering signal from the received signal. As a basis for this, the channel cancellation controller 712 receives either an update tag indication from an update tag extractor 702, or extracted interfering symbols from a interference symbol extractor 704. The update tag extractor has a function as described above with reference to FIG. 4, and for example can get a priori information from a MIB about changes in SIBs. The interference symbol extractor provides portions of the interfering symbol signal, which the channel cancellation controller 712 compares with the regenerated symbol sequence according to what is demonstrated above with reference to FIG. 3. In addition to these alternatives, the channel cancellation controller 712 can employ both checking of an update tag whether to indicate an update and comparing extracted symbols with the regenerated symbols. In addition to this, the channel cancellation controller 712 can control updating of the symbol sequence regenerator, i.e. what symbols that can be expected. A control signal can be provided to the symbol sequence regenerator 714 to update at least a part of the symbol sequence, wherein the symbol sequence regenerator 714 receives extracted symbols from the interference symbol extractor 704 and stores one or more representations of them. Here, the interference symbols can be decoded by the decoder 604 and be processed as described in the example therefore appended to the demonstration with reference to FIG. 6.

Figure 8:
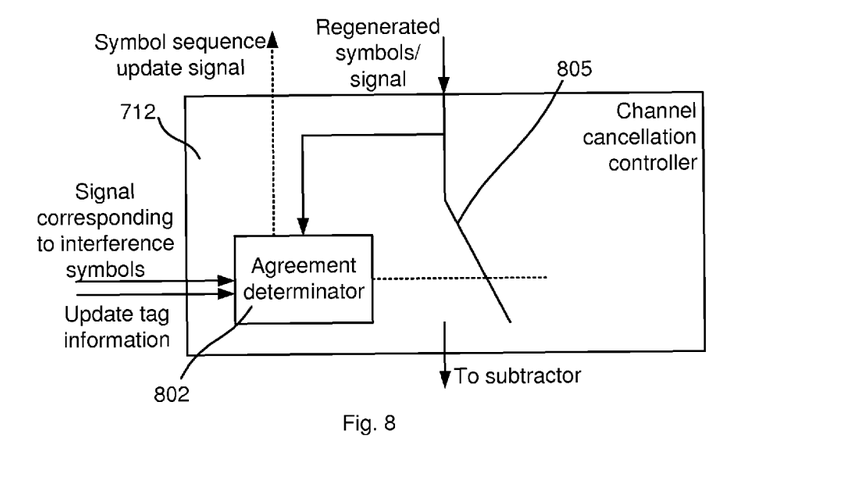
FIG. 8 is a block diagram schematically illustrating a channel cancellation controller according to an embodiment.

FIG. 8 is a block diagram schematically illustrating a channel cancellation controller 712 according to an embodiment. The input and output signals are those as demonstrated with reference to FIG. 7, and their functions will be further elucidated here. The input from the update tag extractor 702 and from the interference symbol extractor 704 are connected to an agreement detector 802. In addition to the functions demonstrated with reference to FIGS. 3 and 4 performed by the agreement detector 802, it can also be involved in the updating of the expected symbol sequence as demonstrated with reference to FIG. 2. Thus, if the agreement detector 802, based on its inputs about signal corresponding to interference symbols and/or update tag information, finds out that a change in the interfering signal has occurred, which can be made by different degree or required confidence, it provides an update signal indicating that the stored expected symbol sequence should be updated and a new set of symbols should be added to the interfering symbol regenerator. At that adding, it can be made as a replacement or just as an addition. Additional data indicating timing or states for the new set of symbols can also be indicated for enabling alignment of the regenerated interfering symbols with the received interfering symbols.

The main task of the agreement determinator 802 is of course to determined agreement between regenerated interfering symbols and received interfering symbols, i.e. whether channel cancellation is to be made. The agreement determinator 802 thereby controls e.g. a switch 805 which enables the regenerated signal to reach the output which is connected to the subtraction circuitry 718. When the switch 805 is open, the adapted baseband signal will be equal to the original baseband signal, but when the switch 805 is closed, channel cancellation is enabled and the subtraction circuitry 718 will subtract the regenerated signal from the received signal.

Figure 9:
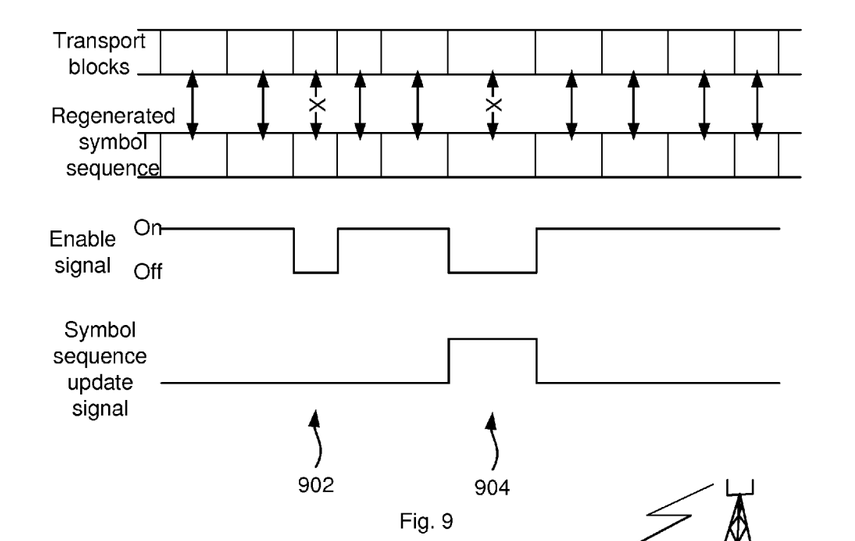
FIG. 9 is a signal diagram illustrating an example of operation according to an embodiment.

FIG. 9 is a signal diagram illustrating an example of operation according to an embodiment. The omission of subtraction of at least the regenerated interfering symbols not agreeing with received interfering symbols is for example controlled as demonstrated with reference to FIG. 8. An alternative can be to stop the regeneration of symbols or providing a bypass of the subtraction circuitry. There is in any case some channel cancellation control or enable signal. This diagram illustrates at its top a number of consecutive transport blocks of an interfering channel, and below that the corresponding regenerated symbol sequence, i.e. the best assumption on what the interfering signal comprises. From left to right, the first and second transport blocks are determined to agree (no X over the mutual arrow), but for the third, and also the sixth transport blocks 902, 904 of the interfering symbols, there is a determination that these do not agree (X over the mutual arrow), i.e. where the regenerated interfering symbols are not agreeing with decoded interfering symbols. This can have been determined in either ways as described with reference to FIG. 3 or 4. Then, the enable signal, for the times of these transport blocks 902, 904, switch from on to off, i.e. the channel cancellation is turned off during the time being of these interfering signal transport blocks 902, 904.

In FIG. 9, at the base, a signal for enabling update regeneration of signals is illustrated. The symbol sequence regenerator can be arranged to update the symbol sequence only for parts of the symbol sequence where the regenerated interfering symbols are not agreeing with received interfering symbols, in this case corresponding to the transport block 904 of the interfering symbols. Considering in this example that the similar situation for transport block 902 not causing any update can be based on statistics and confidence in the change, which also can be based on update information extracted from the signal.

Figure 10:
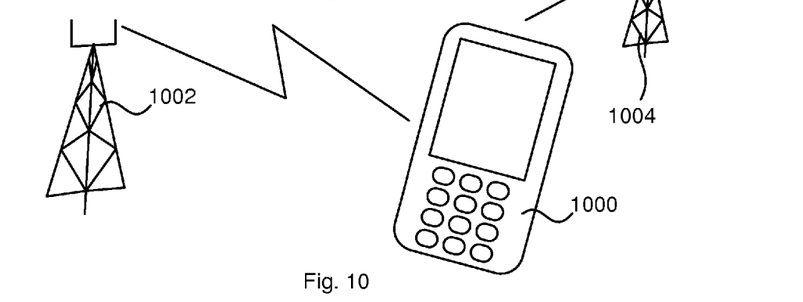
FIG. 10 illustrates an example of a cellular communication apparatus according to an embodiment.

FIG. 10 illustrates an example of a cellular communication apparatus 1000 according to an embodiment. The cellular communication apparatus 1000 is arranged to perform communication or interact with one or more cells each being operated by a base station 1002, 1004. The cellular communication apparatus 1000 comprises a radio receiver 600 as demonstrated with reference to FIG. 6, which enables the cellular communication apparatus to improve reception performance in the complex and sometimes harsh signal environments of a cellular communication system.

Figure 11:
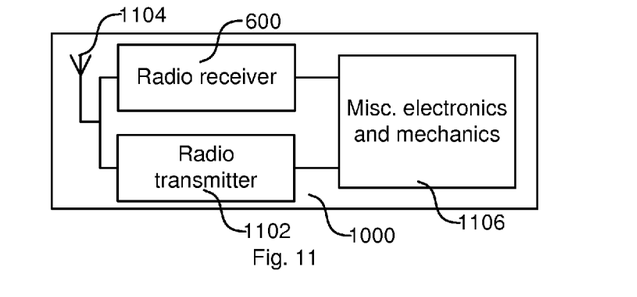
FIG. 11 is a block diagram schematically illustrating a cellular communication apparatus according to an embodiment.

FIG. 11 is a block diagram schematically illustrating a cellular communication apparatus 1000 according to an embodiment. The cellular communication apparatus 1000 comprises a radio receiver 600 as demonstrated with reference to FIG. 6, and a radio transmitter 1102. The radio receiver 600 and the radio transmitter 1102 are connected to one or more antennas 1104 for receiving and transmitting signals to base stations of a cellular communication system in which the cellular communication apparatus is arranged to operate. The cellular communication apparatus 1000 further comprises miscellaneous other electronics 1106 and mechanics commonly comprised in cellular communication apparatuses. The apparatus 1000 can be a cellular phone, a module card, a dongle or a part of a personal computer and arranged to perform cellular communication in which it benefits from its ability to provide adaptive channel cancellation in the complex signal situation of a cellular communication system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of channel cancellation for a cellular communication device, the method comprising:
    receiving a signal comprising desired symbols and interfering symbols;
    regenerating a symbol sequence of interfering symbols expected to be received;
    determining, prior to any complete decoding of the interfering symbols by the cellular communication device, whether one or more received interfering symbols agree with the regenerated interfering symbols, and then
    if the one or more received interfering symbols are determined to agree with regenerated interfering symbols, subtracting the regenerated symbol sequence from the received signal to form an adapted signal, or
    if the one or more received interfering symbols are determined not to agree with regenerated interfering symbols, omitting at least the regenerated interfering symbols not agreeing with the received interfering symbols from the subtracting of the regenerated symbol sequence from the received signal when forming the adapted signal; and then
    decoding the desired symbols from the adapted signal.

2. The method of claim 1, wherein the determining whether one or more received interfering symbols agree with the regenerated interfering symbols comprises comparing a signal corresponding to the one or more received interfering symbols with a signal corresponding to one or more of the regenerated interfering symbols.

3. The method of claim 1, wherein the determining whether one or more received interfering symbols agree with the regenerated interfering symbols comprises detecting an update tag of the interfering symbols, wherein the one or more received interfering symbols are considered not to agree with the regenerated interfering symbols upon indication of an update by the update tag.

4. The method of claim 1, wherein the determining whether one or more received interfering symbols agree with the regenerated interfering symbols includes such a determination for each transport block of interfering symbols of the received signal.

5. The method of claim 4, wherein the omitting of at least the regenerated interfering symbols not agreeing with received interfering symbols from subtraction comprises omitting the regenerated interfering symbols for those transport blocks of the interfering symbols where the regenerated interfering symbols are determined to not agree with received interfering symbols.

6. The method of claim 1, further comprising updating the symbol sequence of interfering symbols expected to be received if one or more received interfering symbols are determined not to agree with regenerated interfering symbols, the updating comprising
decoding the received interfering symbols; and
storing one or more representations of the decoded interfering symbols as the sequence of interfering symbols expected to be received.

7. The method of claim 6, wherein the updating of the symbol sequence only includes parts of the symbol sequence corresponding to transport block of interfering symbols where the regenerated interfering symbols are not agreeing with received interfering symbols.

8. The method of claim 1, wherein the determining whether one or more received interfering symbols agree with regenerated interfering symbols comprises comparing the detected interfering symbols with corresponding regenerated interfering symbols, wherein the comparing of the decoded interfering symbols with corresponding regenerated interfering symbols comprises determining a difference between the decoded interfering symbols with corresponding regenerated interfering symbols, and the determining whether one or more received interfering symbols agree with regenerated interfering symbols comprises comparing the difference with a threshold, wherein agreement is established if the difference is lower than the threshold.

9. A radio receiver for a cellular communication device, comprising:
a radio receiver circuitry arranged to receive a radio signal and provide a baseband signal comprising desired symbols and interfering symbols;
a channel cancellation mechanism arranged to receive the baseband signal from the radio receiver circuitry, and further arranged to output an adapted baseband signal; and
a decoder arranged to decode desired symbols from the adapted baseband signal,
wherein the channel cancellation mechanism comprises:
a symbol sequence regenerator arranged to regenerate interfering symbols expected to be received;
a channel cancellation controller arranged to determine whether the one or more received interfering symbols agree with regenerated interfering symbols; and
a signal subtraction circuitry arranged to, if the one or more received interfering symbols are determined to agree with regenerated interfering symbols, subtract a signal corresponding to the regenerated interfering symbols from the baseband signal to form the adapted baseband signal, or, if the one or more received interfering symbols are determined not to agree with regenerated interfering symbols, omit the subtraction of at least the regenerated interfering symbols not agreeing with the received interfering symbols from the baseband signal when forming the adapted baseband signal,
wherein the channel cancellation controller is arranged to perform the determination before any complete decoding of interfering symbols simultaneous with the desired symbols of the received signal is performed by the radio receiver.

10. The radio receiver of claim 9, wherein the channel cancellation controller comprises an agreement determinator circuit arranged to determine if one or more received interfering symbols agree with regenerated interfering symbols.

11. The radio receiver of claim 10, wherein the agreement determinator circuit comprises a comparator arranged to compare the signal of interfering symbols with corresponding signal of regenerated interfering symbols, wherein the comparator is arranged to determine a difference between extracted interfering symbols with corresponding regenerated interfering symbols, wherein the determination if one or more received interfering symbols agree with regenerated interfering signals comprises a comparison of the difference with a threshold, wherein agreement is established if the difference is lower than the threshold.

12. The radio receiver of claim 9, wherein the channel cancellation controller is further arranged to detect an update tag of the interfering symbols, wherein the one or more received interfering symbols are considered not to agree with the regenerated interfering symbols upon indication of an update by the update tag.

13. The radio receiver of claim 9, wherein the one or more received interfering symbols to be determined whether to agree with the corresponding regenerated interfering symbols comprises determination for each transport block of the interfering symbols of the received signal.

14. The radio receiver of claim 13, wherein the omission of subtraction of at least the regenerated interfering symbols not agreeing with received interfering symbols comprises omission of subtraction of the regenerated interfering symbols for those transport blocks of the interfering symbols where the regenerated interfering symbols are not agreeing with decoded interfering symbols.

15. The radio receiver of claim 9, wherein the symbol sequence regenerator is arranged to update the symbol sequence of interfering symbols expected to be received if one or more detected interfering symbols are determined not to agree with regenerated interfering symbols by decoding the received interfering symbols and store one or more representations of the decoded interfering symbols as the sequence of interfering symbols expected to be received.

16. The radio receiver of claim 15, wherein the symbol sequence regenerator is arranged to update the symbol sequence only for parts of the symbol sequence corresponding to transport blocks of the interfering symbols where the regenerated interfering symbols are not agreeing with received interfering symbols.

17. A cellular communication apparatus comprising a radio receiver, wherein the radio receiver comprises:
a radio receiver circuitry arranged to receive a radio signal and provide a baseband signal comprising desired symbols and interfering symbols;
a channel cancellation mechanism arranged to receive the baseband signal from the radio receiver circuitry, and further arranged to output an adapted baseband signal; and a decoder arranged to decode desired symbols from the adapted baseband signal, wherein the channel cancellation mechanism comprises:

a symbol sequence regenerator arranged to regenerate interfering symbols expected to be received;

a channel cancellation controller arranged to determine whether the one or more received interfering symbols agree with regenerated interfering symbols; and a signal subtraction circuitry arranged to, if the one or more received interfering symbols are determined to agree with regenerated interfering symbols, subtract a signal corresponding to the regenerated interfering symbols from the baseband signal to form the adapted baseband signal, or, if the one or more received interfering symbols are determined not to agree with regenerated interfering symbols, omit the subtraction of at least the regenerated interfering symbols not agreeing with the received interfering symbols from the baseband signal when forming the adapted baseband signal, wherein the channel cancellation controller is arranged to perform the determination before any complete decoding of interfering symbols simultaneous with the desired symbols of the received signal is performed by the radio receiver.

18. A non-transitory computer-readable medium comprising, stored thereupon, a computer program comprising computer executable instructions which, when executed on a processor of a radio receiver, causes the radio receiver to:

receive a signal comprising desired symbols and interfering symbols;

regenerate a symbol sequence of interfering symbols expected to be received;

determine, prior to any complete decoding of the interfering symbols by the cellular communication device, whether one or more received interfering symbols agree with the regenerated interfering symbols, and then if the one or more received interfering symbols are determined to agree with regenerated interfering symbols, subtract the regenerated symbol sequence from the received signal to form an adapted signal, or if the one or more received interfering symbols are determined not to agree with regenerated interfering symbols, omit at least the regenerated interfering symbols not agreeing with the received interfering symbols from the subtracting of the regenerated symbol sequence from the received signal when forming the adapted signal; and then decode the desired symbols from the adapted signal.

\* \* \* \* \*